United States Patent
Huang

(10) Patent No.: US 7,124,849 B2
(45) Date of Patent: Oct. 24, 2006

(54) FOLDABLE TRICYCLE

(75) Inventor: Shun-Tai Huang, Puli Township, Nantou County (TW)

(73) Assignees: Wei-Cheng Huang, Chiayi (TW); Taiwan An I Co., Ltd., Chiayi (TW)

( * ) Notice: Subject to any disclaimer, the term of this patent is extended or adjusted under 35 U.S.C. 154(b) by 347 days.

(21) Appl. No.: 10/759,366

(22) Filed: Jan. 16, 2004

(65) Prior Publication Data

US 2004/0256164 A1 Dec. 23, 2004

(30) Foreign Application Priority Data

Apr. 8, 2003 (TW) .............................. 92205600 U

(51) Int. Cl.
*B60K 1/00* (2006.01)

(52) U.S. Cl. .................. 180/208; 297/16.1; 297/35; 297/378.12; 297/440.15; 297/440.2; 297/440.22; 180/216; 180/65.1

(58) Field of Classification Search ............... 180/65.1, 180/208, 216, 210, 215; 280/647, 650, 87.05, 280/638, 639; 297/16.1, 29, 35, 378.12, 297/440.2, 440.22, 440.15, 337, 57, 59, 378.2
See application file for complete search history.

(56) References Cited

U.S. PATENT DOCUMENTS

| | | | | |
|---|---|---|---|---|
| 2,612,211 A | * | 9/1952 | Gielow et al. | 297/321 |
| 3,369,629 A | * | 2/1968 | Weiss | 180/208 |
| 5,487,437 A | * | 1/1996 | Avitan | 180/6.5 |

FOREIGN PATENT DOCUMENTS

| | | |
|---|---|---|
| EP | 0 458 101 A1 * | 11/1991 |
| JP | 5-162677 A * | 6/1993 |

* cited by examiner

*Primary Examiner*—Ruth Ilan

(57) ABSTRACT

A tricycle includes a body with a handlebar stand pivotally connected to a front portion of the body to steer a front wheel rotatably mounted on a front wheel bracket which is mounted to a front side of the body, two rear wheels rotatably and oppositely mounted on a rear side of the body and respectively driven by a motor, two side plates respectively formed on the body to be opposite to each other for supporting a user's feet, a seat pivotally mounted on top of the body and a backrest frame pivotally mounted on top of the body and detachably connected to the seat.

17 Claims, 10 Drawing Sheets

FOLDABLE TRICYCLE

BACKGROUND OF THE INVENTION

1. Field of the Invention

The present invention relates to a tricycle, and more particularly to a tricycle that is foldable to minimize the space required for storage and transportation without separating parts so that loss of parts is avoided.

2. Description of Related Art

Conventional tricycles are convenient transportation vehicles for short distances. Some senior citizens or disabled people use tricycles from places to places as the tricycle is able to provide a smooth and safe ride for the users. However, when the user wants to travel to a distant location and then uses the tricycle to other destinations, the user will have to load the tricycle on a van or the like to transport the tricycle first. Then the user is able to use the tricycle for other destinations.

The currently available foldable tricycle usually requires the user to disassemble parts from the tricycle assembly and then store the disassembled parts separately for transportation or storage purpose. When the tricycle is used, the user will have to gather all the disassembled parts and then reassemble the parts together for application. When the tricycle is disassembled, the user will have take extra caution for not losing any parts and during assembly of the tricycle, the user will have to go through a series of troublesome and labor inefficient process to complete the assembly procedure, which is not convenient for senior citizens and disabled users.

To overcome the shortcomings, the present invention tends to provide an improved foldable tricycle to mitigate the aforementioned problems.

SUMMARY OF THE INVENTION

The primary objective of the present invention is to provide a tricycle that is foldable without separating parts from the tricycle.

Another objective of the present invention is to provide a pair of auxiliary wheels so that the user is able to pull the disassembled tricycle easily.

Other objects, advantages and novel features of the invention will become more apparent from the following detailed description when taken in conjunction with the accompanying drawings, in which:

DETAILED DESCRIPTION OF THE PREFERRED EMBODIMENT

Figure 1:
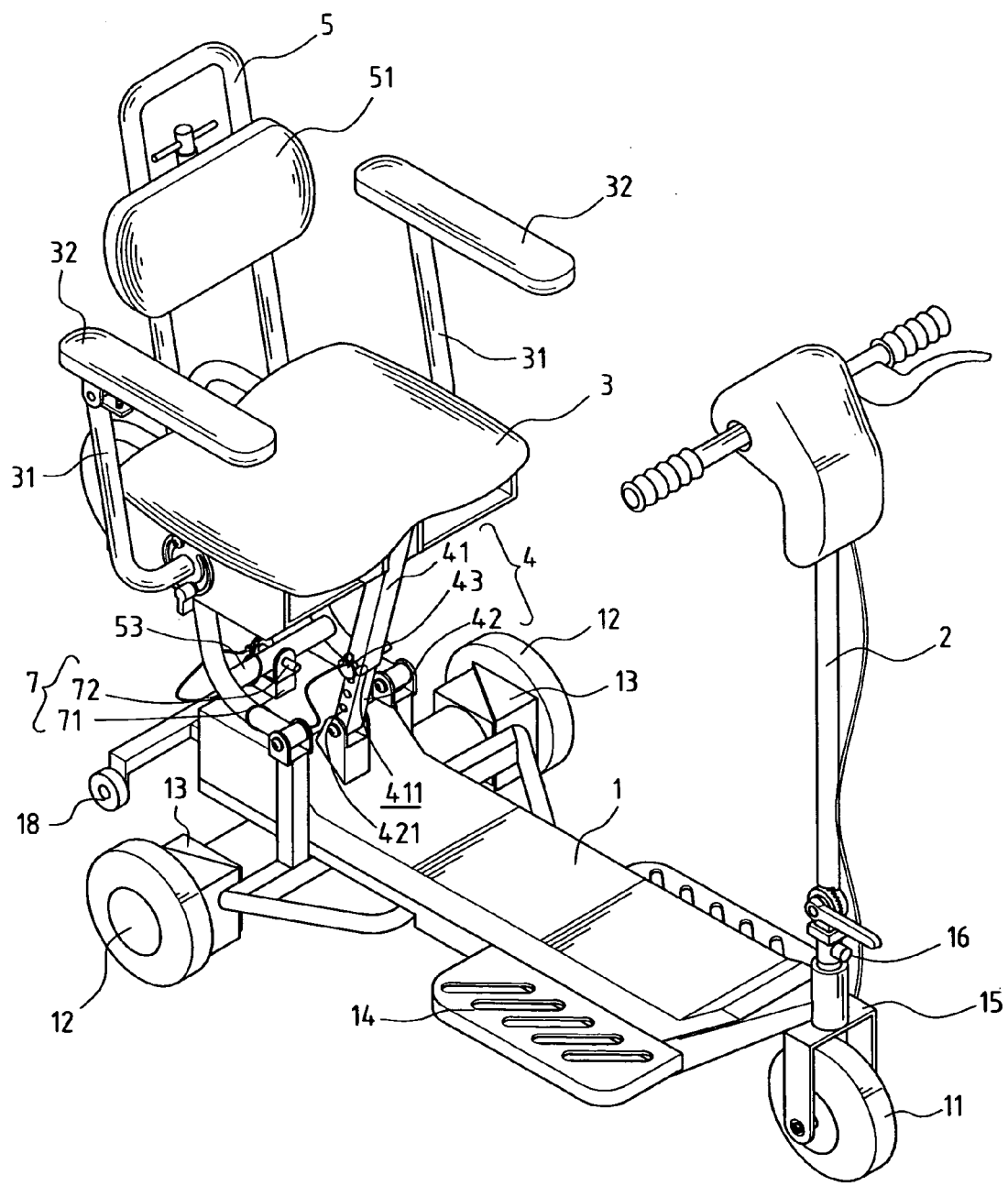
FIG. 1 is a perspective view of a foldable tricycle constructed in accordance with the present invention.

With reference to FIG. 1, a foldable tricycle in accordance with the present invention includes a body 1 with a handlebar stand 2 pivotally connected to a front portion of the body 1 to steer a front wheel 11, a seat 3 pivotally mounted on top of the body 1 and a backrest frame 5 pivotally mounted on top of the body 1 and detachably connected to the seat 3. The body 1 further has two rear wheels 12 respectively and rotatably mounted on opposite sides of the body 1 and two auxiliary wheels 18 rotatably mounted on an extension (not labeled) extending out from a rear of the body 1. A motor 13 is mounted close to the rear wheels 12 for driving the rear wheels 12. Two side plates 14 are respectively formed on the body 1 and opposite to each other for supporting the user's feet. Because how the motor 13 drives the rear wheels 12 is not the subject to be discussed in the present invention, the relationship between the motor 13 and the rear wheels 12 is omitted for brevity.

Figure 2:
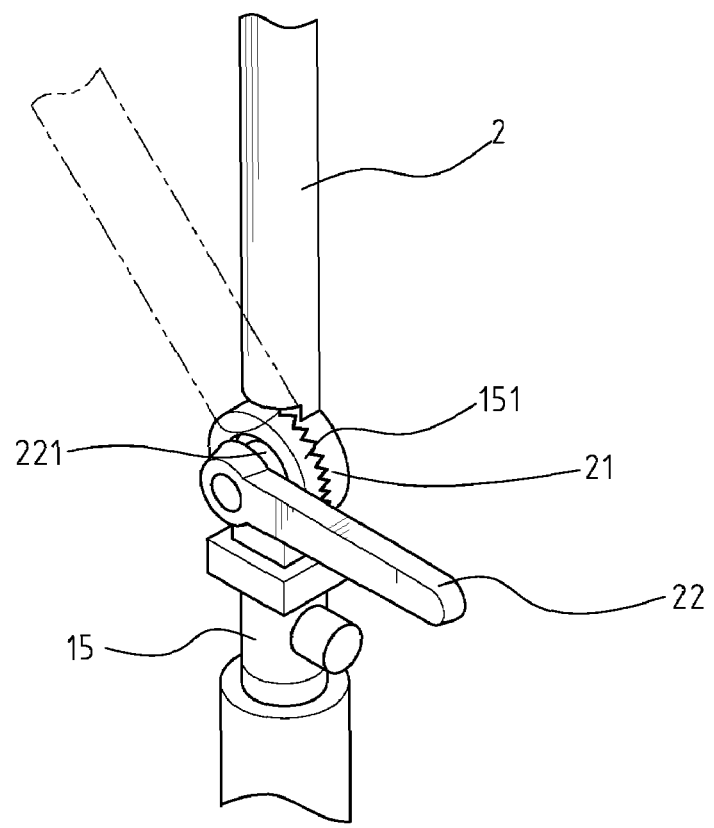
FIG. 2 is a perspective view showing the adjustment of a handlebar stand.

With reference to FIG. 2 and still using FIG. 1 for reference, it is noted that the handlebar stand 2 has a tip formed with a first circular notched surface 21. A front wheel bracket 15 securely connected to the body 1 and having the front wheel 11 rotatably mounted therein is securely connected to the handlebar stand 2 and has a second circular notched surface 151 corresponding to and mated with the first circular notched surface 21. A handle 22 is provided to the handlebar stand 2 and has an eccentric head 221 alternatively abutting to an outer surface of the second circular notched surface 151 of the front wheel bracket 15, such that when the handle 22 is pivoted to release the abutment to the outer surface of the second circular notched surface 151, the first circular notched surface 21 is able to freely rotate relative to the second circular notched surface 151, which means that the handlebar stand 2 is able to pivot relative to the body 1. When the adjustment of the handlebar stand 2 is completed, the handle 22 is pivoted again to have the eccentric head 221 to abut the outer surface of the second circular notched surface 151 again. Thus, the engagement between the first circular notched surface 21 and the second circular notched surface 151 is able to secure the handlebar stand 2 relative to the front wheel bracket 15.

The seat 3 is supported by a seat support 4 pivotally connected to the body 1. The seat support 4 includes a main tube 41 pivotally engaged with a bottom face of the seat 3 and having a first securing hole 411 defined in a free end of the main tube 41, a supporting tube 42 pivotally connected to the body 1 at a first tip thereof and having multiple second securing holes 421 defined through the supporting tube 42 to correspond to the first securing hole 411 of the main tube 41 and a first pin 43 extending through the aligned first and second securing holes 411, 421 of the main tube 41 and supporting tube 42.

Figure 3:
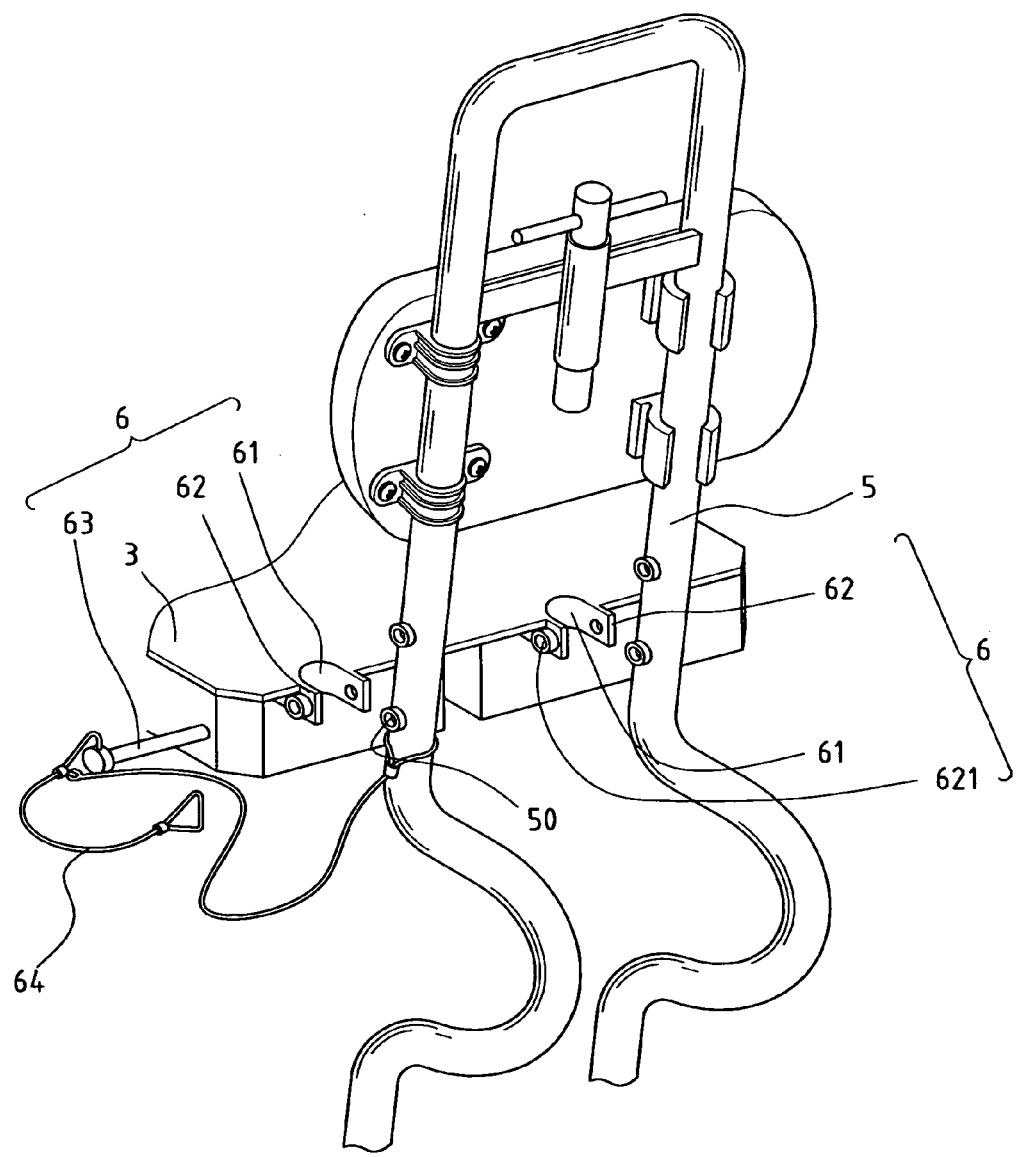
FIG. 3 is a perspective view showing the structural relationship between the backrest and the seat.
Figure 4:
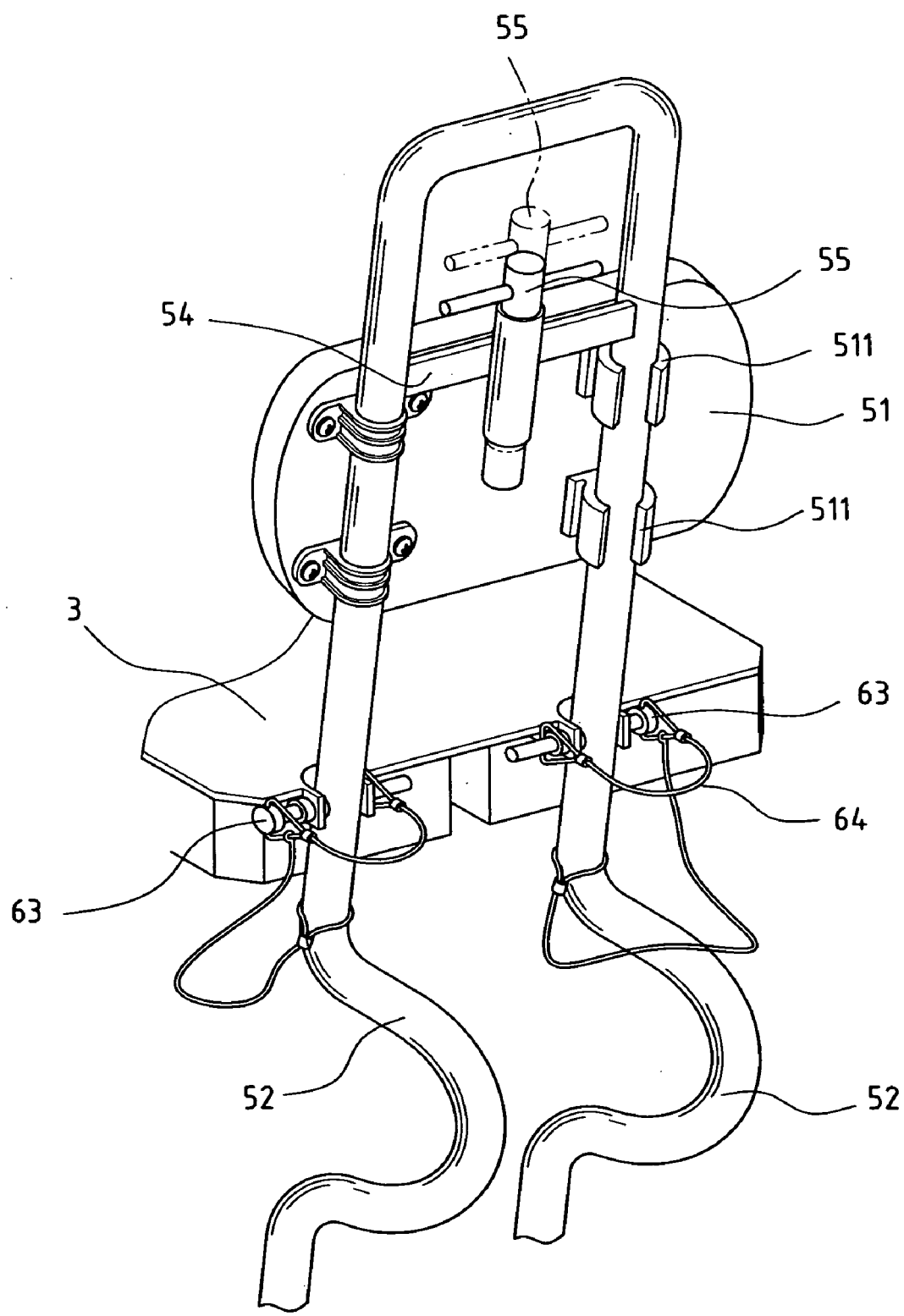
FIG. 4 is a perspective view showing the assembly of a backrest and a seat.

With reference to FIGS. 3 and 4, the seat 3 further has a seat clamping device 6 to secure engagement between the seat 3 and the backrest frame 5. The seat clamping device 6 includes a pair of arcuate cutouts 61 defined in a side of the seat 3, two wings 62 extending out from opposite sides of each of the arcuate cutouts 61 and respectively provided with a pivot hole 621 and a second pin 63 extending into the pivot holes 621 of the two wings 62. Because the backrest frame 5 has an integrally formed tube bent to have two parallel parts, after the two parallel parts of the backrest frame 5 are received in the two arcuate cutouts 61, the second pins 63 are able to extend into the pivot holes 621 of the wings 62 to secure the backrest frame 5 with the seat 3. Preferably, the backrest frame 5 has third securing holes 50 defined in the two parallel parts to correspond to the pivot holes 621 of the seat clamping device 6. Therefore, when the third securing holes 50 of the backrest frame 5 are aligned with the pivot holes 621 of seat clamping device 6, the insertion of the second pins 63 into the aligned third securing holes 50 and the pivot holes 621, the backrest frame 5 is secured with respect to the seat 3. In this preferred embodiment, the second pin 63 is provided with a securing strip 64 one end of which is securely connected to the first pin 63 and the other end of which is securely connected to the backrest frame 5 such that the second pin 63 is retained even after the second pin 63 is removed from the aligned pivot holes 621 and the third securing holes 50.

The backrest frame 5 is pivotally connected to the body 1 via a backrest securing device 7. The backrest frame 5 has a backrest 51 securely mounted on the two parallel parts of the backrest frame 5, two arcs 52 respectively formed on the two parallel parts of the backrest frame 5 and a transverse bar 53 transversely engaging the two parallel parts. The backrest securing device 7 is provided with a securing seat 71 securely mounted on top of the body 1 and a third pin 72 extending through the securing seat 71 and the transverse bar 53 of the backrest frame 5 to secure the backrest frame 5 relative to the body 1. Therefore, removal of the third pin 72 from the securing seat 71 and the transverse bar 53 allows the backrest frame 5 to pivot relative to the body 1 only after the first pin 43 is removed from the aligned first securing hole 411 and the second securing hole 421.

The backrest frame 5 further has a cushion 51 interlinked the two parallel parts of the backrest frame 5. The cushion 51 has two clamps (not labeled) formed on a rear side of the cushion 51 to secure engagement with one of the two parallel parts of the backrest frame 5 and two C-shaped clamps 511 formed on the rear side of the cushion 51 and opposite to the two clamps to receive therein the other one of the two parallel parts of the backrest frame 5. Therefore, the cushion 51 is able to pivot relative to the backrest frame 5 if the other one of the two parallel parts of the backrest frame 5 is removed from the C-shaped clamps 511. Furthermore, a positioning rod 55 is movably received in a board 54 mounted on the rear side of the cushion 51 to correspond to a boss 16 formed on the front wheel bracket 15.

Figure 5A:
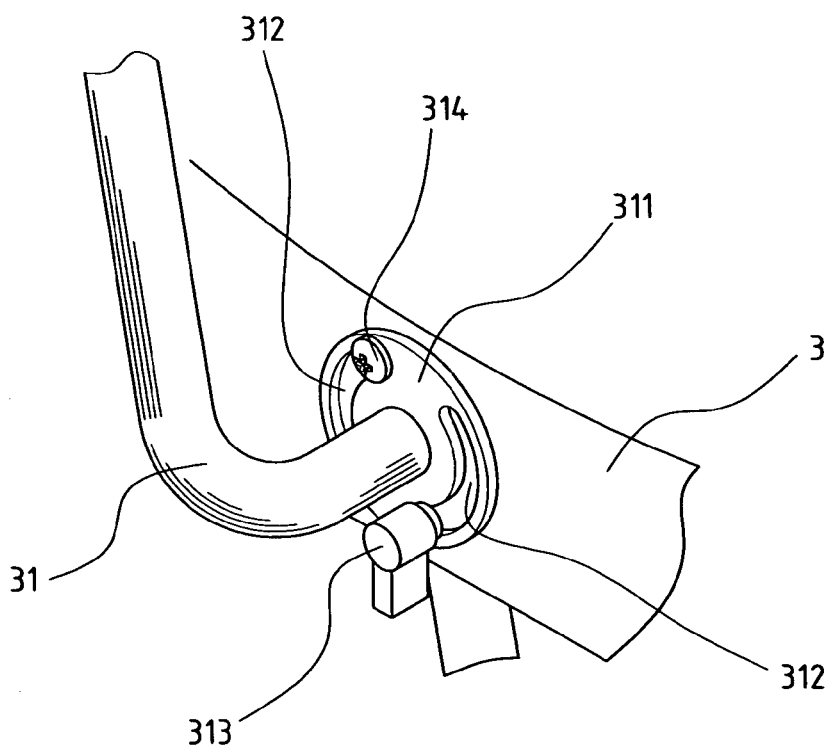
FIG. 5A is a partial perspective view showing the structural relationship between an armrest stand and the seat.
Figure 5B:
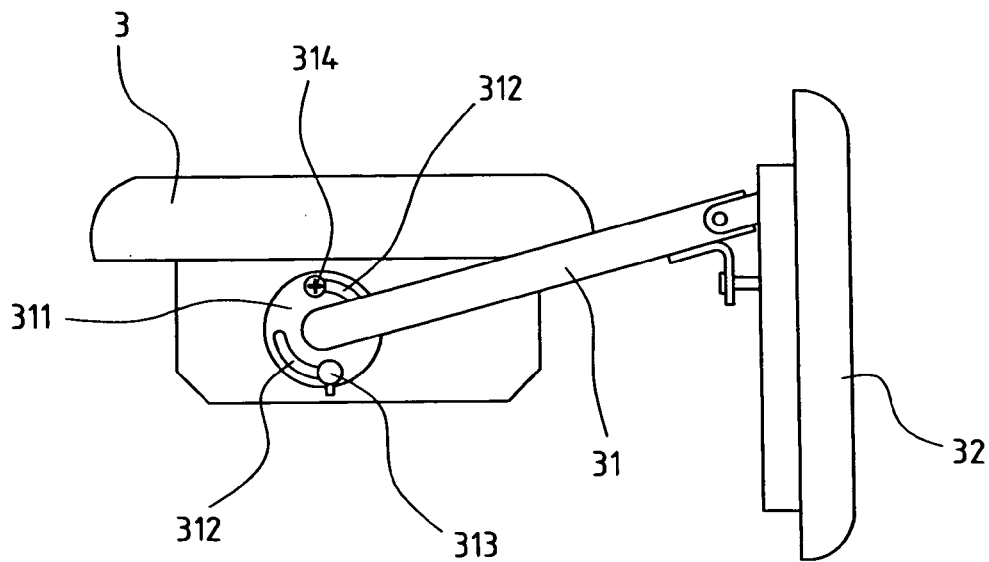
FIG. 5B is a side elevational view showing the adjustment of the armrest stand relative to the seat.

With reference to FIGS. 5A and 5B, it is noted that the armrest stand 31 is provided with a disk 311 integrally formed with the a distal end of the armrest stand 31. The disk 311 is rotatably engaged with a side face of the seat 3 and the seat 3 has a securing knob 313 extendable from the side of the seat 3 and received in one of two arcuate slots 312 in the disk 311. One end of the securing knob 313 is able to threadingly extend into the side of the seat 3 and the other end of the securing knob 313 is able to extend out of one of the two arcuate slots 312 in the disk 311. A guide 314 is formed on the side of the seat 3 and extends out of the other one of the arcuate slot 312. Therefore, if the securing knob 313 is loosened, the armrest stand 31 is able to pivot relative to the seat 3. It is noted that when the armrest stand 31 is pivoting relative to the seat 3, the guide 314 is sliding in one of the arcuate slots 312 to smoothen the pivotal movement of the armrest stand 31. After the armrest stand 31 reaches the predetermined position, securing the securing knob 313 into the side of the seat 3 is thus able to secure the armrest stand 31 relative to the seat 3.

Figure 6:
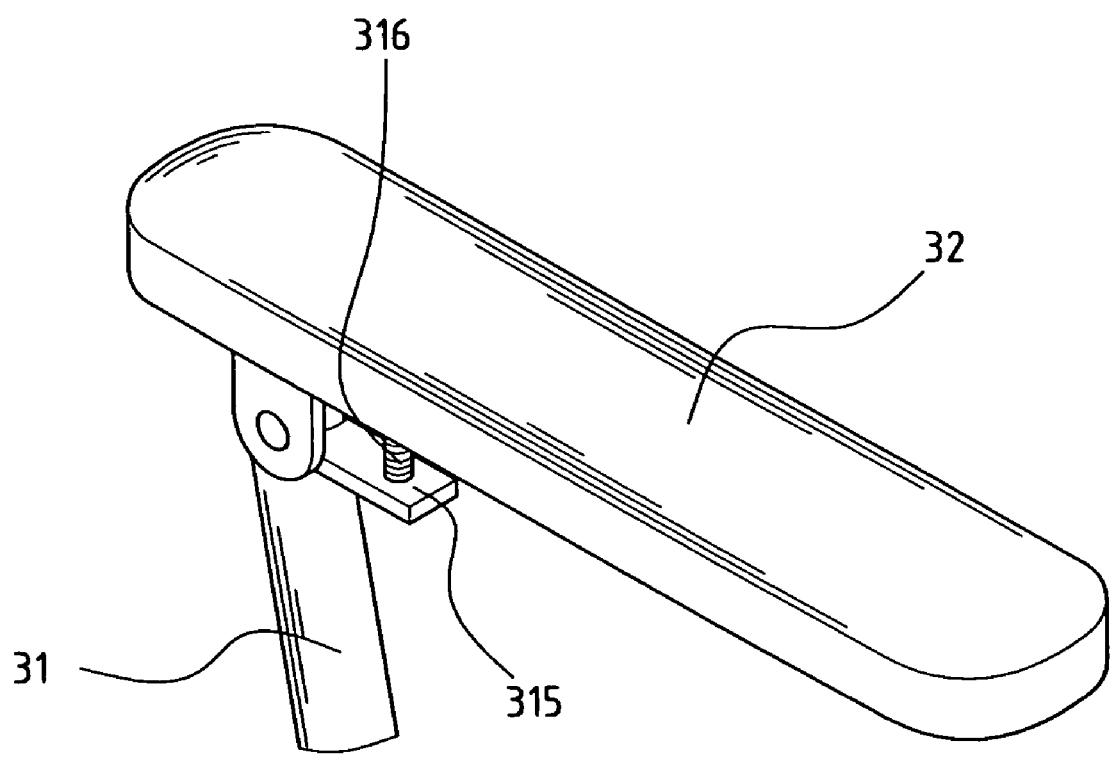
FIG. 6 is a perspective view showing the structural relationship between the armrest stand and an armrest.

With reference to FIG. 6, an armrest 32 is pivotally connected to the armrest stand 31. A support 315 is integrally formed with a joint between the armrest 32 and the armrest stand 31 and has a bolt 316 threadingly extending through the support 315. The bolt 316 has a free end abutting to a bottom face of the armrest 32 such that rotation of the bolt 316 to change the length of the bolt 316 relative to the support 315 is able to change the inclination of the armrest 32. Therefore, the user is able to use the bolt 316 to adjust the inclination of the armrest 32.

Figure 7:
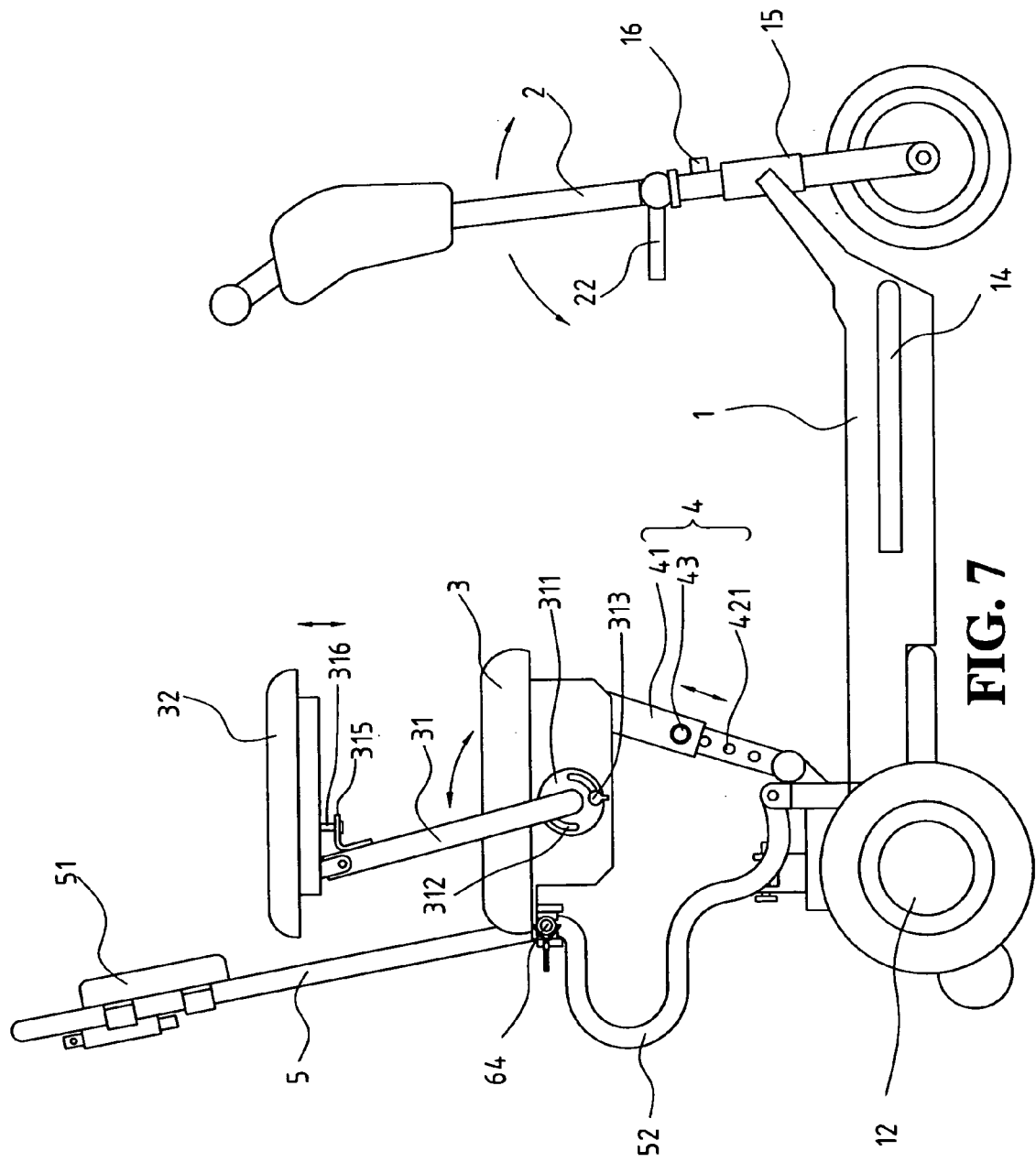
FIG. 7 is a side elevational view showing that the seat is securely connected to the backrest.

With reference to FIG. 7, it is noted that the handlebar stand 2 is able to adjust its inclination with respect to the body 1, the seat 3 is able to adjust its position via the seat support 4 and the armrest 32 is able to adjust its inclination relative to the body 1 so that the user is able to have the most comfortable structure to drive the tricycle.

Figure 8:
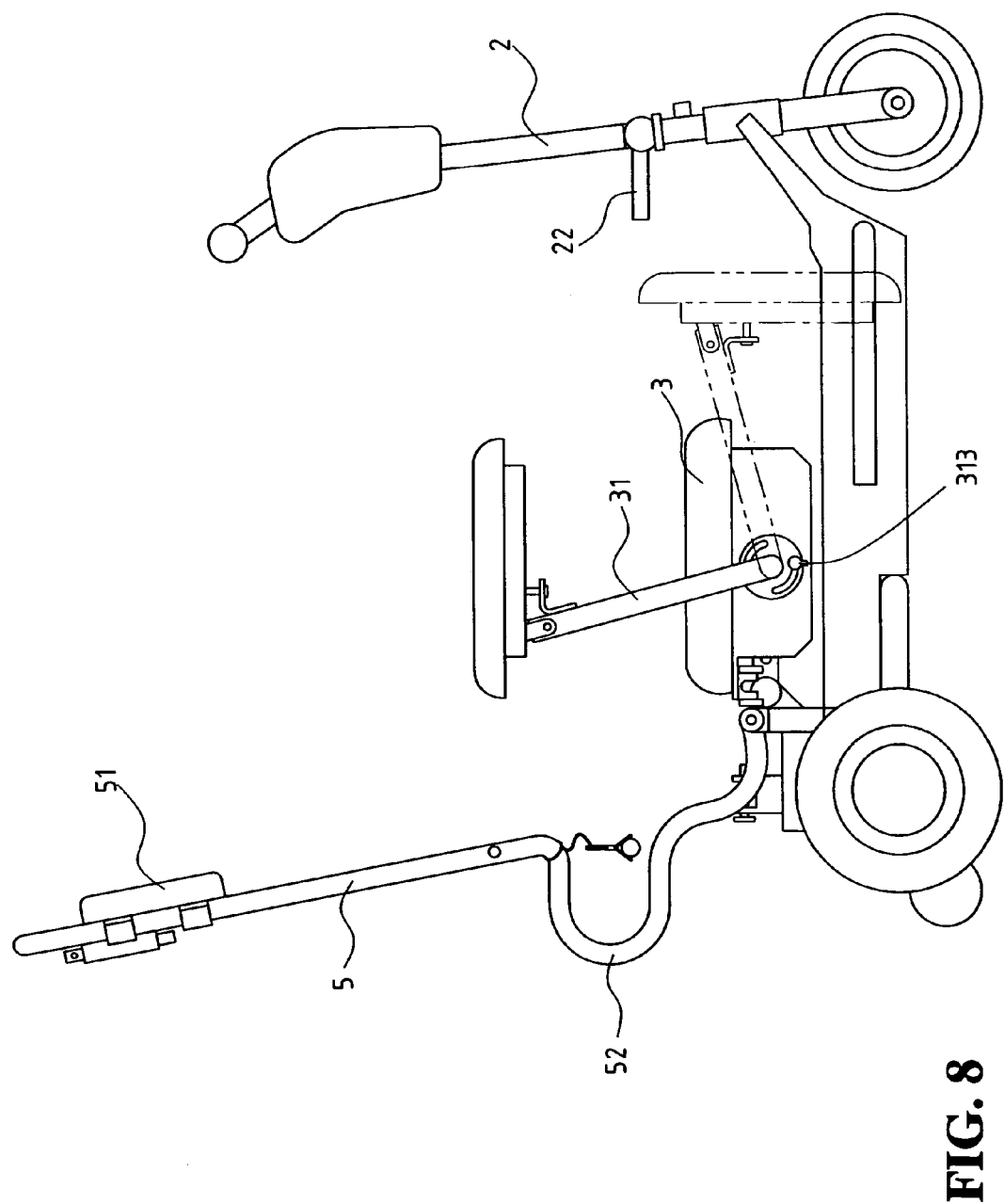
FIGS. 8–10 are side elevational views showing successive steps of folding the tricycle of the present invention.
Figure 9:
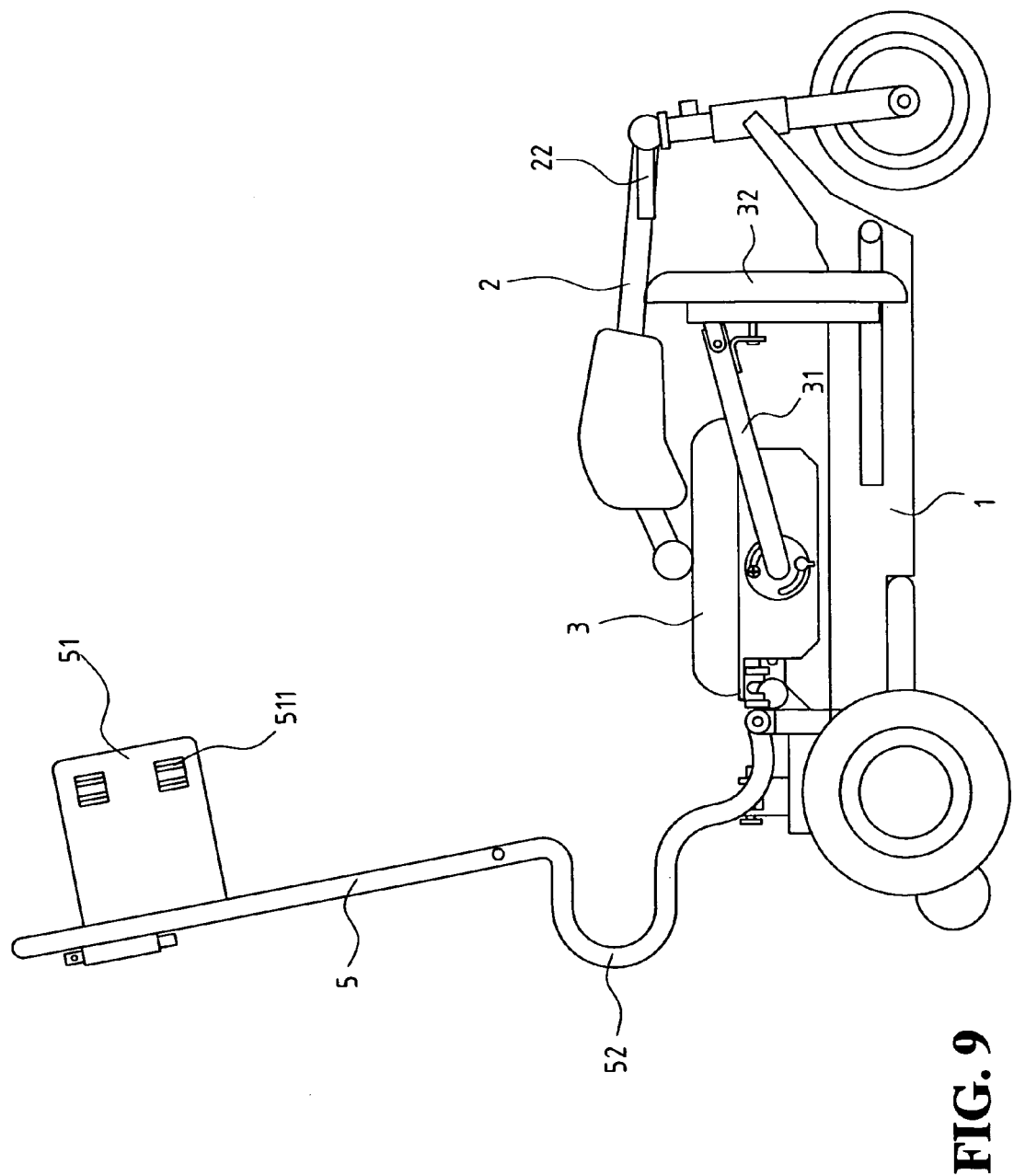
Figure 10:
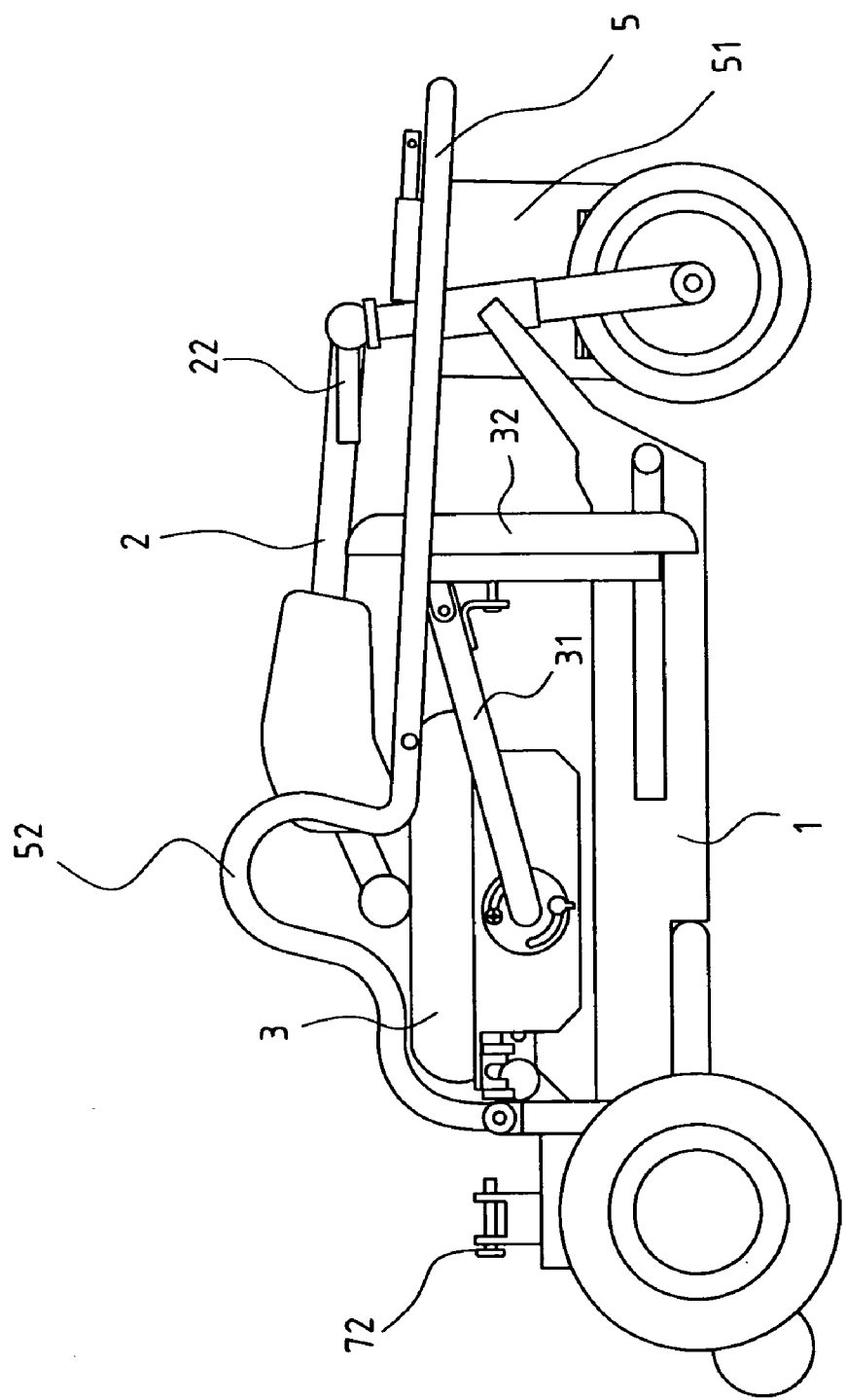

With reference to FIG. 8–10, when the tricycle of the present invention is to be folded, the second pin 63 is removed to disengage the backrest frame 5 with the seat 3. Then the first pin 43 is removed from the main tube 41 and the supporting tube 42 to allow the seat 3 to rotate relative to the body 1. After the seat 3 is rotated toward the body 1, the securing knob 313 is secured to position the armrest stand 31 after the armrest stand 31 is pivoted toward the body 31 via loosening the securing knob 313.

The handle 22 is pivoted to allow the first circular notched surface 21 to rotate relative to the second circular notched surface 151 so as to have the handlebar stand 2 to pivot relative to the body 1. Thereafter the handle 22 is pivoted to secure the engagement between the first and second circular notched surfaces 21, 151.

Meanwhile the cushion 51 of the backrest frame 5 is released from the C-shaped clamps 511 to allow the cushion 5 to be pivoted to a side relative to the body 1. Then the third pin 72 is removed to allow the backrest frame 5 to pivot relative to the body 1. Then the positioning rod 55 is secured to the boss 16 so as to secure the position of the backrest frame 5 relative to the body 1.

It is noted that after the tricycle of the present invention is folded, the user is able to drag the tricycle by the backrest frame 5. Due to the auxiliary wheels 18, the user is able to readily bring the tricycle from places to places. Furthermore, the user is able to hold one of the arcs 52 and the backrest frame 5 to easily carry the tricycle to any desired location. Because the folded tricycle is compact, the user is able to carry the tricycle in the trunk of a car such that the tricycle is convenient to the user.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A tricycle comprising:
 a body with a handlebar stand pivotally connected to a front portion of the body to steer a front wheel rotatably mounted on a front wheel bracket which is mounted to a front side of the body, two rear wheels rotatably and oppositely mounted on a rear side of the body and respectively driven by a motor, two side plates respectively formed on the body to be opposite to each other for supporting a user's feet;

a seat pivotally mounted on top of the body; and a backrest frame pivotally mounted on top of the body and detachably connected to the seat;

wherein the seat is supported by a seat support pivotally connected to the body and having a main tube pivotally engaged with a bottom face of the seat, the main tube having a first securing hole defined in a free end of the main tube, a supporting tube pivotally connected to the body at a first tip of the supporting tube, the supporting tube having multiple second securing holes defined through the supporting tube to correspond to the first securing hole of the main tube and a first pin extendable through the first hole and an aligned second securing hole to support the seat.

2. The tricycle as claimed in claim 1, wherein the body further has two auxiliary wheels extending from the rear side of the body so that the user is able to use the two auxiliary wheels to move the tricycle.

3. The tricycle as claimed in claim 2, wherein the backrest frame further has a cushion linked with the backrest frame and having two clamps formed on a rear side of the cushion to secure engagement with the backrest frame and two C-shaped clamps formed on the rear side of the cushion and opposite to the two clamps to receive therein a portion of the backrest frame so that when the portion of the backrest frame is removed from the C-shaped clamps, the cushion is pivotable relative to the backrest frame.

4. The tricycle as claimed in claim 1, wherein the handlebar stand has a tip formed with a first circular notched surface and the front wheel bracket has a second circular notched surface rotatably mated with the first circular notched surface so that the handlebar stand is able to pivot relative to the body.

5. The tricycle as claimed in claim 4, wherein a handle having an eccentric head abuts an outer surface of the second circular notched surface to alternately force the first and second circular notched surfaces to abut each other to secure the handlebar stand relative to the body so that when the handle is pivoted to have the eccentric head to abut the outer surface of the second circular notched surface, the first and second circular notched surfaces are secured relative to each other and the handlebar stand is secured relative to the body, and when the handle is pivoted to release engagement between the first and second circular notched surfaces, the handlebar stand is able to pivot relative to the body.

6. The tricycle as claimed in claim 5, wherein the backrest frame further has a cushion linked with the backrest frame and having two clamps formed on a rear side of the cushion to secure engagement with the backrest frame and two C-shaped clamps formed on the rear side of the cushion and opposite to the two clamps to receive therein a portion of the backrest frame so that when the portion of the backrest frame is removed from the C-shaped clamps, the cushion is pivotable relative to the backrest frame.

7. The tricycle as claimed in claim 4, wherein the backrest frame further has a cushion linked with the backrest frame and having two clamps formed on a rear side of the cushion to secure engagement with the backrest frame and two C-shaped clamps formed on the rear side of the cushion and opposite to the two clamps to receive therein a portion of the backrest frame so that when the portion of the backrest frame is removed from the C-shaped clamps, the cushion is pivotable relative to the backrest frame.

8. The tricycle as claimed in claim 1, wherein the seat further has a seat clamping device to secure engagement between the seat and the backrest frame.

9. The tricycle as claimed in claim 8, wherein the backrest frame further has a cushion linked with the backrest frame and having two clamps formed on a rear side of the cushion to secure engagement with the backrest frame and two C-shaped clamps formed on the rear side of the cushion and opposite to the two clamps to receive therein a portion of the backrest frame so that when the portion of the backrest frame is removed from the C-shaped clamps, the cushion is pivotable relative to the backrest frame.

10. The tricycle as claimed in claim 8, wherein the seat clamping device has a pair of arcuate cutouts defined in a side of the seat, each arcuate cutout having two wings extending out from opposite sides with a pivot hole provided on each wing and a second pin extending into the pivot holes of the two wings to secure the engagement between the seat and the backrest frame.

11. The tricycle as claimed in claim 10, wherein the backrest frame has third securing holes defined in two parallel parts of the backrest frame to correspond to the pivot holes of the seat clamping device so that when the third securing holes are aligned with the pivot holes, the second pins are extended into the aligned third securing holes and the pivot holes, the backrest frame is secured with the seat.

12. The tricycle as claimed in claim 10, wherein the backrest frame further has a cushion linked with the backrest frame and having two clamps formed on a rear side of the cushion to secure engagement with the backrest frame and two C-shaped clamps formed on the rear side of the cushion and opposite to the two clamps to receive therein a portion of the backrest frame so that when the portion of the backrest frame is removed from the C-shaped clamps, the cushion is pivotable relative to the backrest frame.

13. The tricycle as claimed in claim 11, wherein the backrest frame has a backrest securely mounted on the two parallel parts of the backrest frame, two arcs respectively on the two parallel parts of the backrest frame and a transverse bar transversely engaging the two parallel parts is pivotally connected to the body via a backrest securing device which has a securing seat securely mounted on top of the body and a third pin extending through the securing seat and the transverse bar of the backrest frame to secure the backrest frame relative to the body so that removal of the third pin from the securing seat and the transverse bar allows the backrest frame to pivot relative to the body only after the first pin is removed from the first securing hole and the aligned second securing hole.

14. The tricycle as claimed in claim 11, wherein the backrest frame further has a cushion linked with the backrest frame and having two clamps formed on a rear side of the cushion to secure engagement with the backrest frame and two C-shaped clamps formed on the rear side of the cushion and opposite to the two clamps to receive therein a portion of the backrest frame so that when the portion of the backrest frame is removed from the C-shaped clamps, the cushion is pivotable relative to the backrest frame.

15. The tricycle as claimed in claim 13, wherein the backrest frame further has a cushion linked with the backrest frame and having two clamps formed on a rear side of the cushion to secure engagement with the backrest frame and two C-shaped clamps formed on the rear side of the cushion and opposite to the two clamps to receive therein a portion of the backrest frame so that when the portion of the backrest frame is removed from the C-shaped clamps, the cushion is pivotable relative to the backrest frame.

16. The tricycle as claimed in claim 1, wherein the backrest frame further has a cushion linked with the backrest frame and having two clamps formed on a rear side of the cushion to secure engagement with the backrest frame and two C-shaped clamps formed on the rear side of the cushion and opposite to the two clamps to receive therein a portion of the backrest frame so that when the portion of the backrest frame is removed from the C-shaped clamps, the cushion is pivotable relative to the backrest frame.

17. A tricycle comprising:
   a body with a handlebar stand pivotally connected to a front portion of the body to steer a front wheel rotatably mounted on a front wheel bracket which is mounted to a front side of the body, two rear wheels rotatably and oppositely mounted on a rear side of the body and respectively driven by a motor, two side plates respectively formed on the body to be opposite to each other for supporting a user's feet;

a seat pivotally mounted on top of the body; and
   a backrest frame pivotally mounted on top of the body and detachably connected to the seat;
   wherein the backrest frame further has a cushion linked with the backrest frame and having two clamps formed on a rear side of the cushion to secure engagement with the backrest frame and two C-shaped clamps formed on the rear side of the cushion and opposite to the two clamps to receive therein a portion of the backrest frame so that when the portion of the backrest frame is removed from the C-shaped clamps, the cushion is pivotable relative to the backrest frame.

* * * * *